July 23, 1929.   O. A. DAHLBERG   1,721,508
CREEPER
Filed Dec. 27, 1926
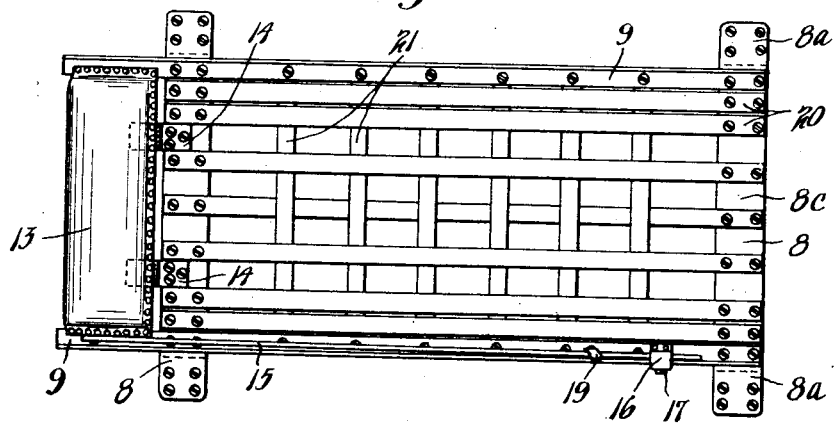
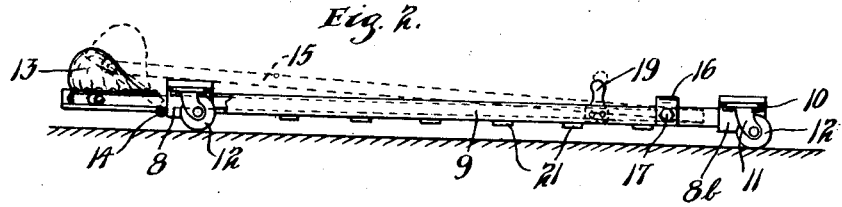
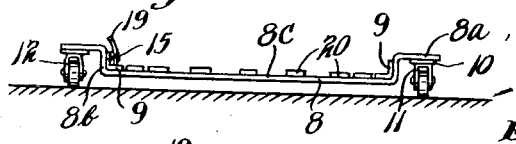
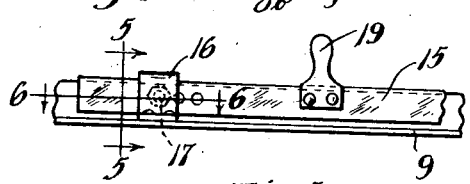
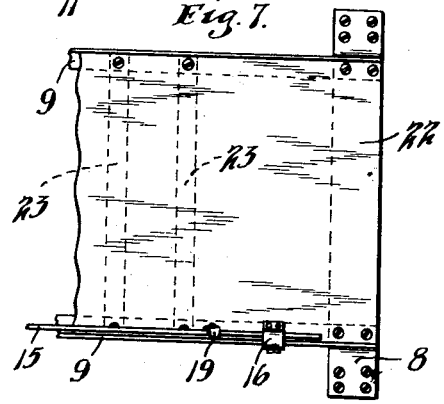
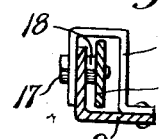
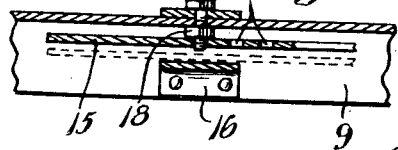
INVENTOR.
OSCAR A. DAHLBERG.
BY HIS ATTORNEYS.

Patented July 23, 1929.

1,721,508

UNITED STATES PATENT OFFICE

OSCAR A. DAHLBERG, OF MINNEAPOLIS, MINNESOTA.

CREEPER.

Application filed December 27, 1926. Serial No. 157,087.

This invention relates to creepers adapted to be used by mechanics when working underneath automobiles. The clearance between the under portions of automobiles and the ground is very small and, accordingly, it is very difficult for a mechanic to lie under an automobile and still have room within which to comfortably work on the automobile. Creepers have been used which generally consist of wheeled frames upon which a mechanic may lie, the object of the creeper being to provide a device whereby the mechanic may readily shift the position of his body underneath the automobile. It is found that if small casters are used on these creepers that the casters will quickly give out and will have to be replaced and, also, that the casters will catch in depressions or small pits commonly found on the surface upon which the creepers are being used to prevent the creepers being readily moved. It is also found that if large casters are used and are placed directly under the frame of the creeper that there will be insufficient clearance between the ground and the parts of the automobile for the mechanic to lie on the creeper and still have room enough to properly work on the automobile.

It is an object of this invention, therefore, to provide an automobile creeper comprising an underslung frame adapted to receive the body of a mechanic, the frame lying within close proximity to the ground, whereby when the device is in use there will be sufficient clearance between the body of the mechanic and the lower portion of the automobile, so that the mechanic may effectively work thereon.

A further object is to provide in such a device an adjustable rest for supporting the head of the mechanic.

These and other objects and advantages of the present invention will more fully appear from the following description made in connection with the accompanying drawings wherein like reference characters refer to the same or similar parts throughout the various views, and in which, Fig. 1 is a plan view of one embodiment of the present invention, Fig. 2 is a view in side elevation of the device illustrated in Fig. 1, the head rest being shown in full lines in lowered position and in dotted lines in a raised position.

Fig. 3 is a rear end elevation of the device illustrated in Fig. 1.

Fig. 4 is a view showing certain parts of applicant's device, the view being taken in side elevation and looking outwardly from in side of the frame.

Fig. 5 is a vertical section taken on the line 5—5 of Fig. 4, as indicated by the arrows.

Fig. 6 is a horizontal section taken on the line 6—6 of section 4, as indicated by the arrows, and, Fig. 7 is a partial plan view of a slightly different embodiment of the invention.

Referring to the drawings, a pair of spaced bars 8 are provided, the said bars having substantially horizontally extending portions $8^a$ at their ends, then having the downwardly extending short vertical portions $8^b$ inwardly from portions $8^a$, and the lower horizontal portion $8^c$ connecting the two vertical portions $8^b$. Portions $8^b$ and $8^c$ form a wide channel. A pair of spaced angle bars 9 connect the bars 8 and form therewith a substantially rectangular frame, the vertical flanges of angle bars 9 abutting vertical portions $8^b$ of bars 8 and the horizontal flanges of the angle bars 9 being secured to the horizontal portions $8^c$ of bars 8. Vertically swiveling casters are secured to the under sides of each of the portions $8^a$. The said casters comprise bearing plates 10 secured to portions $8^a$ as by screws, forked bearings 11 vertically pivoted in plates 10, and caster wheels 12 horizontally pivoted to the forked bearings 11. An upholstered and padded head rest 13 is pivotally secured to one of the bars 8 by hinges 14. Preferably angle bars 9 are extended outwardly from the bar 8 at the head rest end of the frame to permit the horizontal flanges of the extended portions being used as supports for the head rest 13 when the same is in lowered position. An operating bar 15 at one side of the frame has one end pivoted to head rest 13 adjacent the outer portion of one end thereof, bar 16 extending from the head rest 13 rearwardly adjacent the vertical flange of one of the angle bars 9. A keeper 16 is secured to the angle bar 9 adjacent which bar 15 extends, the bar 15 extending through the keeper 16 and being retained therein. A bolt 17 extends through the outer side of the keeper 16 and through the vertical flange of the angle bar 9 to which keeper 16 is secured, a nut 18 at the inner side of the vertical flange securing the keeper and the vertical flange together.

Operating bar 15 is provided with a plurality of spaced apertures 15ª adjacent the bolt 17, within any one of which the inner projecting end of bolt 17 is adapted to fit. There is sufficient clearance between the inner end of the bolt 17 and the inner side of the keeper 16 so that bar 15 may be pressed inwardly towards the inner side of the keeper to release the inner end of bolt 17 from engagement in an aperture 15ª. A small operating handle 19 is secured to operating bar 15 towards its lower end. By grasping handle 19, pressing bar 15 inwardly and pushing the same rearwardly head rest 13 may be raised to a desired height whereupon the inner end of bolt 17 may be engaged in one of the apertures 15ª to retain the head rest 13 in the desired position.

In the embodiment of the device, illustrated in Figs. 1, 2, and 3, a plurality of longitudinal bars 20 are provided secured to the horizontal portions 8ᶜ of bars 8 as by screws. Preferably, a pair of the bars 20 are placed in closely spaced arrangement at either side of the frame for supporting tools or the like. A plurality of spaced transverse bars 21 are secured to the horizontal flanges of angle bars 9, the said bars 15 extending transversely of the frame beneath all of the longitudinal bars 20 with the exception of the central bar 20. The longitudinal and transverse bars 20 and 21, respectively, form the bottom for the creeper upon which the body of a mechanic is adapted to rest.

In the embodiment of the invention illustrated in Fig. 7, a solid rectangular sheet 22 is substituted for the bars 20 and 21, the said sheet 22 fitting within the channeled portion of the rectangular frame and resting on, and being secured to portions 8ᶜ preferably by means of screws. A pair of brace bars 23 preferably are extended transversely beneath plate 22 adjacent the central portion thereof, the said bars 23 acting to prevent the central portion of plate 22, forming the body of the creeper, from sagging. The remainder of the construction of the device illustrated in Fig. 7 is the same as that illustrated in Figs. 1, 2, 3, 4, 5 and 6.

A mechanic may lie on the device illustrated, either on the bottom portion formed by the bars 20 and 21, or if the plate 22 is used, upon the plate 22. The mechanic's head will rest upon the head rest 13. Due to the channeled construction of the frame, the mechanic's body will lie closely adjacent the ground. Accordingly, there will be sufficient clearance between the ground and the lower portions of the car for the mechanic to push himself underneath the car while on the creeper, and for the mechanic to work with freedom on the lower portion of the car when he is once beneath the same. The head rest 13 may be raised or lowered to suit the convenience of the mechanic, the handle 19 being in convenient position to be grasped for operation of bar 15 when the mechanic is lying on the creeper. The creeper can be moved in any direction due to both the vertical swiveling of forked bearings 10 and to the horizontal pivoting of the caster wheels 12. Due to the fact that the casters are secured to the raised portions 8ª of the bars 8, large caster wheels 12 may be used which will not readily wear out and will easily ride over depressions or small pits in the floor upon which the creeper is used to permit the position of the creeper being readily shifted.

The device has been amply demonstrated in actual practice and has been found to be very successful in operation. The parts are few and the construction is simple, strong and durable.

It will, of course, be understood that various changes may be made in the form, details, arrangement and proportions of the various parts without departing from the scope of the present invention, which, generally stated, consists in the matter shown and described and set forth in the appended claims.

What is claimed is:

1. A creeper for automobiles, comprising a pair of spaced horizontal bars having downwardly pressed central U-shaped channels therein and portions extending outwardly from said channels substantially above the bottoms thereof, a pair of angle bars connecting said first mentioned bars in the angles formed by each channel and secured to and in contact with the same to reinforce the sides of said channels, said horizontal and angle bars forming a substantially rectangular frame, casters having wheels of relatively large diameter vertically swivelled in the portions of said horizontal bars outward from said channels, and a bottom secured in the said channels.

2. A creeper for automobiles, comprising a substantially rectangular frame mounted on casters, a head rest hinged to said frame, an operating bar pivoted at one end to said head rest, a keeper secured to one side of said frame, said bar extending through said keeper, whereby as said bar is moved said head rest will be swung in respect to said frame, and means secured to said frame for engaging said bar to hold the head rest in a desired adjusted position.

In testimony whereof I affix my signature.

OSCAR A. DAHLBERG.